Feb. 16, 1943.     C. A. CARRING     2,311,519
FILTERING AND STERILIZING APPARATUS FOR WATER
Filed June 20, 1939
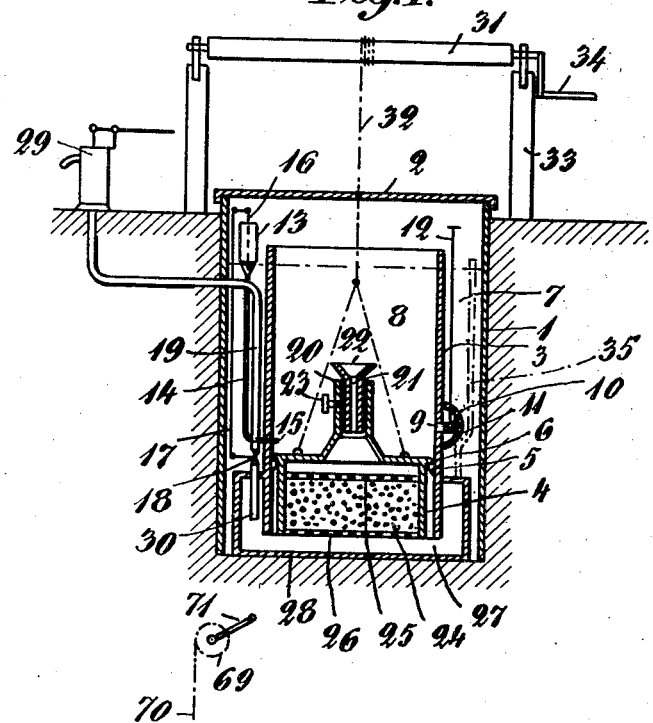
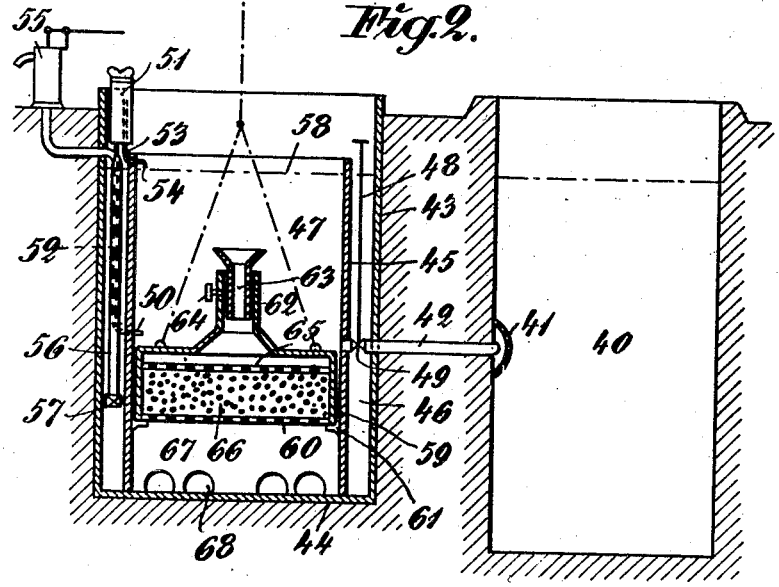
INVENTOR
Carl Algot Carring
By Stevens and Davis
ATTORNEYS Patented Feb. 16, 1943

2,311,519

UNITED STATES PATENT OFFICE 2,311,519

FILTERING AND STERILIZING APPARATUS FOR WATER

Carl Algot Carring, Stockholm, Sweden

Application June 20, 1939, Serial No. 280,169
In Sweden June 25, 1938

4 Claims. (Cl. 210—123)

The present invention refers to an apparatus for the sterilization and filtering of water in such districts where water works are lacking and where as a rule one is reduced to avail oneself of such crude water sources as wells, lakes and other water-courses. To avoid the risk of infection through the water it is then often necessary to subject the occurring crude water to sterilization as well as to filtering, and the invention has for its object to provide an apparatus of this type which is of a simple and cheap construction while being at the same time entirely safe in operation.

The apparatus according to the present invention is characterized by a container adapted to be lowered into a well and divided by a filter basket into an upper sterilizing zone and a lower pure water zone communicating through the basket whereby the crude water is led into the sterilizaing zone at a place disposed below the normal surface level of the crude water to provide for a gravity feed and a communication is established between the atmosphere and the pure water zone to which a sterilizing agent is supplied by valve controlled means and in which a pure water withdrawing conduit terminates at a point above the lower end of the filter basket.

According to the invention an automatic suction valve can be provided in the withdrawing conduit which valve is operated by a pump and connected with the valve control means for the sterilizing agent in such a way that these means are open when the valve is opened and the sterilizing medium is fed at a rate directly proportional to the rate of withdrawal of pure water.

The lower portion of the container can be provided with means for loosely supporting the filter basket so that if the container is open at the top the filter basket may be lowered and raised independently of the container.

It is also possible to control the supply of the sterilizing agent to the zone of sterilization in such a way that the sterilizing agent is filled in a closed container connected with the zone of sterilization by a conduit and that a second conduit leads from the upper portion of this container to the water level of the zone of sterilization. If this water level is lowered air will flow through the second conduit to the upper portion of the container for the sterilizing agent which will be supplied through the first conduit to the zone of sterilization; this supply is continued until the water level is again so high that air cannot enter in the second conduit.

Two embodiments of the invention are illustrated in the accompanying drawing.

Fig. 1 shows a vertical section through a crude water well having an apparatus according to invention inserted therein.

Fig. 2 shows a vertical section thronugh a well having another embodiment of the apparatus inserted therein, and wherein the crude water is supplied from another well.

In Fig. 1, 1 designates the crude water well covered by the cover 2. Resting on the bottom of the well is the container 3 inserted into the well and open at the top, said container having a filtering basket 4 inserted therein. As indicated, the filtering basket 4 is carried by the fact that an annular flange 6 thereof is resting on an annular flange 5 arranged on the wall of the container 3. Provided between the flanges 5 and 6 is a suitable tightening packing so that the water cannot flow past the outside of the filtering basket. The space 7 about the container constitutes a collecting chamber for crude water. The space 8 in the container 3 above the filtering basket constitutes the sterilization chamber and communicates with the crude water space 7 through an intake 9 which is controlled by the valve 10. 11 denotes a strainer adapted to protect the intake 9. The valve 10 is operated from above by means of the rod 12. 13 designates a storage container for sterilizing agent arranged beside the container 3, the outlet conduit 14 of said storage container opening at 15 into the sterilization chamber 8. An outlet valve in the container 13 is controlled by a rod 16 which is connected through a link and lever mechanism 17 to a non-return valve 18 provided in a suction conduit 19 for purified water, in a manner such that when purified water is taken off the well, the movement of the non-return valve 18 will be transmitted to the valve rod 16, so that the outlet of the container 13 is opened and sterilizing agent is supplied to the chamber 8, whereas the valve rod 16 will again close the outlet of the container 13 when the drawing of the water through the conduit 19 is interrupted.

Arranged on the filtering basket 4 is an upwardly directed pipe socket 20. Displaceably arranged within this piope socket is another pipe having a flared inlet opening 22, said pipe being adapted to be locked in different desired positions by means of a locking screw 23. The treated water flows from the sterilization chamber 8 through the pipe 21 and the socket 20 into the filtering basket, in which the filtering mass 24 is arranged between the perforated bottoms 25 and 26. From the filtering basket, the treated and filtered water flows into a collecting chamber 27 for the purified water, said collecting chamber being built together with the lower portion of the container 3 and being entirely shut off from the well. At the same time the bottom 28 of the chamber 27 forms a bottom for the whole container 3 and rests directly on the bottom of the well. In the example shown, the chamber 27 extends both underneath and annularly about the filtering basket 4, but may obviously also be formed in some other manner.

The lower portion of the suction pipe 19 enters the chamber 27, said pipe being connected at the top to a pump 29 for the drawing of the purified water. The intake opening 30 of the suction conduit 19 is preferably disposed on a higher level than that of the outlet bottom 26 of the filter to prevent the production of a vacuum in the filter during the pumping of pure water. The pipe 35 shown by chain-dotted lines is a vent pipe connecting the chamber 27 with the atmosphere, so that atmospheric pressure will always prevail in the chamber 27.

The loosely mounted filtering basket 4 is of such an external width relatively to the free space of the sterilization chamber 8 that the same may be raised off hand out of the container for inspection, cleaning, exchange of filtering mass, and so forth. The sterilization chamber 8 has no parts disposed therein that would prevent or interfere with the raising of the filtering basket, such as pipes, valves and the like.

31 denotes a roller mounted on the standards 33 to wind up the hoisting line 32 of the filtering basket when the latter is to be raised, the roller being then turned by means of the crank 34.

In the embodiment according to Fig. 2, 40 designates a crude water well from which crude water is taken through the conduit 42 protected by the strainer 41. 43 is a well provided with a closed bottom 44 and with walls that are impervious to water, the cylindrical container 45, which is open at the top, being inserted in said well so as to rest on the bottom 44. The space 46 between the container 45 and the well 43 forms a collecting space for the purified water. The conduit 42 opens in the wall of the container 45 into that portion 47 of the same which constitutes the sterilization chamber. The valve inlet is controlled from above by means of the valve rod 48 and the valve 49 in the conduit 42.

Opening in the wall of the chamber 47 is also an inlet 50 for sterilizing agent which is supplied from the storage container 51 for sterilizing agent arranged at the top beside the container 45, an outlet conduit 52 leading from the container 51 down to the inlet 50. The container 51 is closed at the top, and from the upper portion thereof leads another conduit 53 in a downward direction, the opening of the latter conduit being arranged at the water level in the container 45. When this water level in the container is lowered at the drawing of pure water from the chamber 46 by means of the pump 55 and the suction conduit 56 provided with a non-return valve 57, air will flow in through the conduit 53 to the upper portion of the container 51, so that sterilizing agent will be supplied through the conduit 52 to the water in the chamber 47. This supply is continued until the water level in the container 45 has again risen to the height indicated by the line 58 when the supply of sterilizing agent is interrupted.

The bottom 60 of the filtering basket 59 inserted loosely into the container 45 is carried by the annular flange 61 on the wall of the container 45, a suitable tightening packing then preventing any flow of water past the outside of the filtering basket.

As in Fig. 1, the filtering basket is provided with an upwardly directed supply socket 62 with a displaceable supply pipe 63 inserted therein, said supply pipe having a flared inlet which may be locked at different levels by means of the screw 64. The treated water flows from the sterilization chamber 47 through the supply pipes 63, 63 into the filtering basket and is filtered by the filtering material 66 provided between the perforated bottoms 65 and 60. From the space 67 underneath the outlet bottom 60 of the filter, which is arranged at a distance above the bottom 44, the purified water flows out through openings 68 in the lowermost portion of the container 45 and enters the annular collecting chamber 46 for the purified water.

69 indicates a winding roller for the hoisting line 70 of the filtering basket, said line being wound into the roller by the turning of a crank 7. Here, too, the external width of the filtering basket is so adapted relatively to the free space of the sterilization chamber, and the pipe conduits and the valves and the like are so arranged, that the hoist basket may be raised off hand out of the container 45.

The filtering and sterilization apparatus according to the invention is not limited to the illustrated embodiments only, but may obviously be varied in different ways, without the principle of the invention being departed from.

In the embodiments shown, filtering takes place from above and downwardly, and the filtering basket is loosely mounted in the container. It is possible, however, to cause the filtering to take place from below and upwardly. In such a case, the portion of the container located above the filtering basket is arranged as a collecting chamber for pure water, while a chamber located underneath the filtering basket is arranged as a sterilization chamber. In such a construction, which is particularly suitable for small wells, the filtering basket may be rigidly connected with the container.

Having now particularly described the nature of my invention and the manner of its operation what I claim is:

1. Filtering and sterilization apparatus for water comprising, a container adapted to be lowered into a well, a filter basket in said container dividing the same into an upper sterilizing zone and a lower pure water zone communicating through said basket, inlet means adapted to establish communication between the crude water of a well and said sterilizing zone, said inlet being disposed below the normal surface level of the crude water to provide for a gravity feed, valve controlled means for supplying a sterilizing agent to said zone of sterilization, means establishing communication between said pure water zone and atmosphere, and a withdrawing conduit terminating in said pure water zone at a point above the lower edge of said filter basket.

2. Filtering and sterilization apparatus for water comprising, a container adapted to be lowered into a well, a filter basket in said container dividing the same into an upper sterilizing zone and a lower pure water zone communicating through said basket, inlet means adapted to establish communication between the crude water of a well and said sterilizing zone, said inlet being disposed below the normal surface level of the crude water to provide for a gravity feed, valve controlled means for supplying a sterilizing agent to said zone of sterilization, means establishing communication between said pure water zone and atmosphere, a withdrawing conduit terminating in said pure water zone at a point above the lower edge of said filter basket, an automatic suction valve in said conduit, means for operating the same, and means connecting said valve controlled means and said suction valve for opening the former as said operating means opens the latter, whereby to feed the sterilizing agent at a rate directly proportional to the rate of withdrawal of pure water.

3. A filter and sterilization apparatus according to claim 1 in which said container is open at the top so that the filter basket may be lowered and raised, and in which the lower portion of the container is provided with means for loosely supporting the filter basket, whereby the filter basket may be removed from the well independently of the container.

4. Filtering and sterilization apparatus for water comprising, a primary container adapted to be lowered into a well, a filter basket in said primary container dividing the same into an upper sterilizing zone and a lower pure water zone communicating through said basket, inlet means adapted to establish communication between the crude water of a well and said sterilizing zone, said inlet being disposed below the normal surface level of the crude water to provide for a gravity feed, a secondary closed container adapted to hold a sterilizing agent, said secondary container being disposed above the upper extremity of said primary container, a conduit extending from said secondary container to a point near the bottom of the zone of sterilization, a vent conduit leading from the upper portion of said secondary container to a point adjacent the upper extremity of said zone of sterilization, said two conduits and the liquid in the zone of sterilization constituting a hydraulic valve for controlling the supply of a sterilizing agent to the zone of sterilization, means establishing communication between said pure water zone and atmosphere and a withdrawing conduit terminating in said pure water zone at a point above the lower edge of said filter basket.

CARL ALGOT CARRING.